(12) United States Patent
Paakkunainen

(10) Patent No.: US 6,193,002 B1
(45) Date of Patent: Feb. 27, 2001

(54) ACTUATOR FOR ACCOMPLISHING THE SWINGING MOTION OF A SWINGING ARM

(75) Inventor: Marko Paakkunainen, Tampere (FI)

(73) Assignee: Plustech Oy (FI)

( * ) Notice: Subject to any disclaimer, the term of this patent is extended or adjusted under 35 U.S.C. 154(b) by 0 days.

(21) Appl. No.: 09/269,377

(22) PCT Filed: Sep. 25, 1997

(86) PCT No.: PCT/FI97/00575

§ 371 Date: Mar. 25, 1999

§ 102(e) Date: Mar. 25, 1999

(87) PCT Pub. No.: WO98/13251

PCT Pub. Date: Apr. 2, 1998

(30) Foreign Application Priority Data

Sep. 25, 1996 (FI) .................................................. 963823

(51) Int. Cl.$^7$ .................................................. B62D 51/06
(52) U.S. Cl. .................................................. 180/8.1; 180/8.6
(58) Field of Search .................................. 180/8.1, 8.2, 8.3, 180/8.4, 8.5, 8.6, 203; 91/508, 511, 525, 533

(56) References Cited

U.S. PATENT DOCUMENTS

| | | | |
|---|---|---|---|
| 4,109,742 | 8/1978 | Fairchild et al. | 180/20 |
| 4,266,627 | * 5/1981 | Lauber | 180/8 B |
| 4,527,650 | 7/1985 | Bartholet | 180/8.6 |
| 4,558,758 | * 12/1985 | Littman et al. | 180/8.1 |
| 4,565,487 | * 1/1986 | Kroczynski | 414/730 |
| 4,662,465 | 5/1987 | Stewart | 180/8.1 |
| 5,353,886 | 10/1994 | Paakkunainen | 180/8.1 |
| 5,842,533 | * 12/1998 | Takeuchi | 180/8.1 |

FOREIGN PATENT DOCUMENTS

| | | |
|---|---|---|
| 601 049 | 6/1978 | (CN) . |
| 32 45 191 A1 | 6/1984 | (DE) . |
| 195 47 687 A1 | 6/1997 | (DE) . |
| 0 119 409 | 11/1986 | (EP) . |
| WO 95/29836 | 9/1995 | (WO) . |
| WO 96/07580 | 9/1996 | (WO) . |

* cited by examiner

Primary Examiner—Brian L. Johnson
Assistant Examiner—Tony Winner
(74) Attorney, Agent, or Firm—Quarles & Brady LLP

(57) ABSTRACT

An actuator particularly for accomplishing the swinging motion of a swinging arm comprises two cylinders using a pressurized medium, the piston rods of the cylinders being connected to a structure rotatable in relation to the swinging arm for the purpose of rotating the swinging arm around a rotation axis by the effect of movements of the pistons of the cylinders. The actuator comprises two control valves, of which one control valve is arranged to guide the pressurized medium either to both cylinders while they are coupled in parallel, or solely to one cylinder where its piston rod chamber and piston chamber are coupled together. This results in a movement of the piston outwards, because the pressure is directed to the whole work area of the piston on the side of the piston chamber and on the side of the piston rod chamber only to the work area which is the difference between the cross-sectional areas of the piston and the piston rod. Further, the pressurized medium needs to be supplied only in an amount proportional to said difference for achieving the same speeds of motion as before.

8 Claims, 1 Drawing Sheet

ACTUATOR FOR ACCOMPLISHING THE SWINGING MOTION OF A SWINGING ARM

CROSS-REFERENCES TO RELATED APPLICATIONS

Not Applicable.

STATEMENT REGARDING FEDERALLY SPONSORED RESEARCH OF DEVELOPMENT

Not Applicable.

BACKGROUND OF THE INVENTION

The invention relates to an actuator for accomplishing the swinging motion of a swinging arm, wherein the swinging arm refers to a swinging arm carrying a load and usually accomplishing a progressive movement of a so-called walking vehicle, such as a forest machine, by means of its rotating movement. Thus, the swinging arm is part of a leg that is articulated with another structure, such as a body of a vehicle, to be pivotal with respect thereto around its rotation axis. An actuator is arranged to be effective on both sides of the rotation axis, for providing a torque at the rotation axis. The swinging arm constitutes thus the leg or the like in the vehicle, or a part of the leg. The vehicle moves when it is carried by the legs in turns. The stage when the leg or the like carries the vehicle when in contact with the ground and moves it in relation to the ground, is called in this application the supporting stage, and the stage of transferring the leg in the air from one supporting stage to another, is called the transfer stage. As a rule, there are at least four legs, but usually their number is six, and each leg generally comprises at least two swinging arms which are connected to each other pivotally, the upper one being mounted pivotally on the body of the vehicle, usually on a piece pivotal in relation to the body.

In known solutions, the swinging motion of the swinging arm is accomplished preferably with two hydraulic cylinders connected at one end to the swinging arm and at the other end to a structure, in relation to which the swinging arm is arranged to pivot. The pair of cylinders alternately lifts and descends the swinging arm in relation to the rotation axis at its end. Depending on the positions of the leg, e.g. an alternating supporting stage and transfer stage of the leg are accomplished with the movements. A good example of such a leg that can have two swinging arms is the previous Finnish Patent No. 87171 by the applicant.

It is obvious that a relatively great force is required at the supporting stage, which will further require high cylinder volumes and particularly large piston work areas. Consequently, the greatest problem with the efficiency of the actuator is that because of the large work areas, a high volume flow rate of the pressurized medium must be used at the transfer stage to retain sufficiently high motion speeds at the transfer stage. Particularly in hydraulic systems, in which the pump supplies to several actuators existing at mutually different loading situations, the supply pressure of the pump is always sufficiently high in view of the maximal load. This means that the supply pressure of the pump at the transfer stage is not in correct proportion to the pressure required by the load, the pressure difference is lost in the control valves or the like and in the flow channel system, and the pump must thus be used with an unnecessarily high power input. In the above-mentioned vehicles advancing by means of the swinging motion of the swinging arm and having several actuators requiring pressurized medium for the progressive movement, one problem is still the sufficiency of pump capacity due to great momentary needs of volume flow. The hydraulic system, for example a hydraulic fluid tank, must be dimensioned according to these high peaks of volume flow. Moreover, the pump capacity cannot be increased arbitrarily without exceeding the efficiency of the driving motor.

SUMMARY OF THE INVENTION

The purpose of this invention is to eliminate the disadvantage presented above and thus to improve the prior art in the field. For this purpose, the actuator according to the invention is characterized in a system feeding pressurized medium required for the operation of the cylinder, not only to cylinders coupled in parallel in a manner known as such, but alternatively to only one of the two cylinders of the actuator, particularly in the transfer stage. Thus, the most considerable advantage of the invention is the possibility to limit the volume flow of the pressurized medium from the pump and simultaneously to save pump capacity, which is important in the case of a walking vehicle comprising several actuators. As a natural result, the pump and its drive motor do not need to be loaded unnecessarily during the transfer stage, a fact substantially reducing the operating costs in the long run. On the other hand, the speed of propagation of the vehicle will not suffer from limiting the volume flow at the transfer stage. Also the operating efficiency at the transfer stage will be substantially improved, as will be presented below.

The other characteristics of the actuator according to the invention will be disclosed in the appended dependent claims.

BRIEF DESCRIPTION OF THE DRAWINGS

In the following description, the invention will be described with reference to the appended drawings, in which.

DETAILED DESCRIPTION OF THE PREFERRED EMBODIMENT

Figure 1:
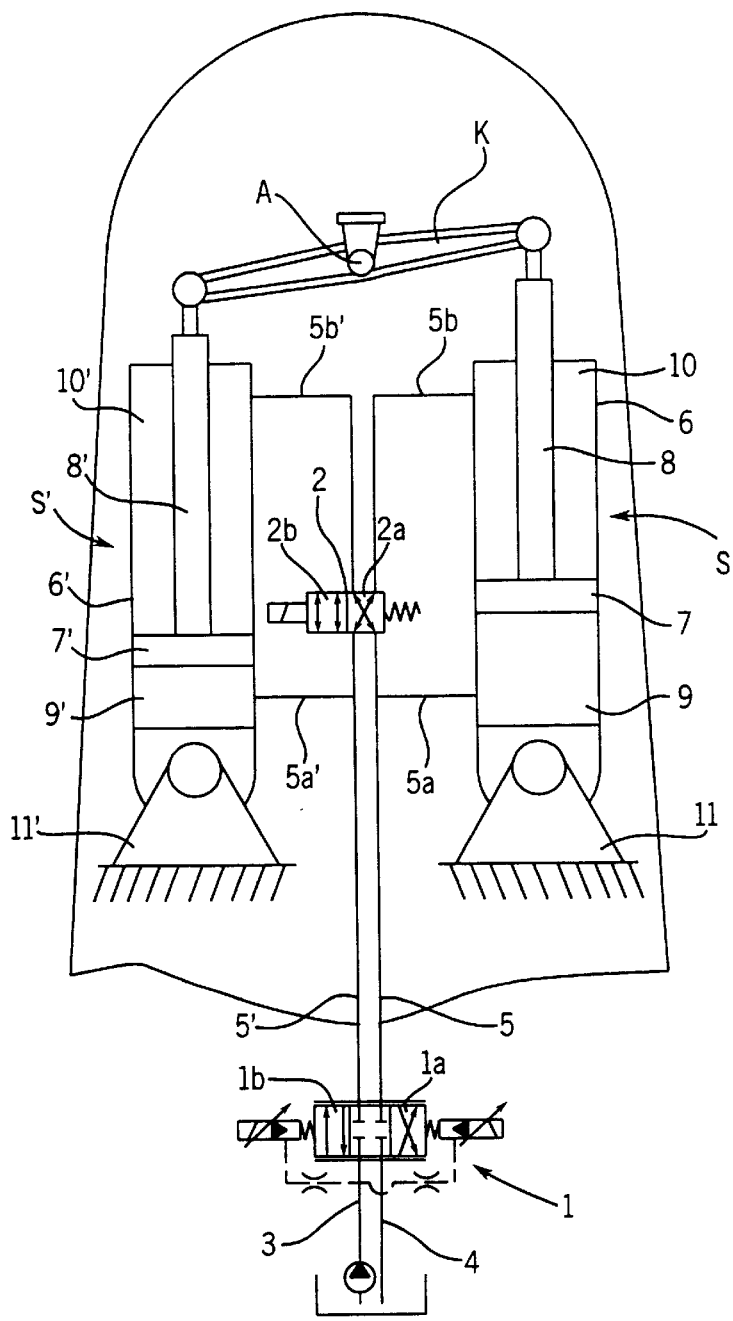
FIG. 1 shows the actuator schematically seen from the side.

In this context, an actuator refers to a pair of hydraulic cylinders and a valve controlling the flow of pressurized medium to them.

The actuator according to the invention consists of two cylinders S, S' fixed at fixing points 11, 11' in a swinging arm. The cylinders comprise in a known way a chamber 6, 6' accommodating a moving piston 7, 7' dividing the chamber in two working chambers, a piston chamber 9, 9' and a piston rod chamber 10, 10'. The piston rods 8, 8' of the cylinders are connected to ends of a rotation piece K, the piece being connected in a torsionally rigid manner to an element, in relation to which the swinging arm is arranged rotatable according to the movements of the pistons 7, 7' around a rotational axis A extending through the piece K. A first control valve 1 (4/3 directional valve) is placed at the junction of the connecting lines 5, 5' leading to the cylinders and a supply line 3 and a return line 4. Pressurized medium is supplied to the cylinders from the pressurized medium tank by a pump through the supply line 3, and the guiding of the pressurized medium appropriately to the chambers 6, 6' is arranged with the first control valve 1 by changing the position of parts 1a, 1b between the line pair formed by the supply line 3 and the return line 4 and the line pair formed by the connecting lines 5, 5' leading to the chambers 6, 6'. The supply line 3 is connected with either of the two connecting lines 5, 5' depending on the position of the control valve 1, and the control valve also has a position separating the actuator entirely from the pump.

The connecting lines 5, 5' are further branched into first branch lines 5a, 5a' leading to the piston chambers 9, 9' and into second branch lines 5b, 5b' leading to the piston rod chambers 10, 10'.

A second control valve 2, a 4/2 directional valve also known as such, is located downstream the branching point of the first branch lines 5a, 5a', guiding the flow from the connecting lines 5, 5' in the pair formed by the second branch lines 5b, 5b' either so that as in a normal parallel connection, pressurized medium is supplied simultaneously through the first branch line to the piston chamber of the first cylinder, and through the second branch line, controlled by the first position 2a of the second control valve 2, to the piston rod chamber of the second cylinder, i.e. pressurized medium is supplied to both cylinders, or pressurized medium is supplied to only one of the cylinders, wherein the first branch line to its piston chamber and the second branch line to its piston rod chamber are, controlled by the second position 2b of the second control valve 2, connected with each other, i.e. the pressurized one of the connecting lines 5, 5' is connected simultaneously with both the piston chamber and the piston rod chamber of the same cylinder.

The coupling is implemented by normal directional control valve technique, whereby a valve in the pair of lines (second branch lines 5b, 5b') couples the connections on its opposite sides together, either directly or crosswise.

When the pressurized medium passes through the first position 2a of the valve to both chambers 6, 6', the pressurized medium returns from the other sides of the pistons to the pressurized medium tank via the branch lines of the return sides to the same connecting line 5 or 5' and further along the return line 4. This is a normal parallel connection providing a great torque at the joint due to the large work area (work area of the piston chamber of one cylinder+work area of the piston rod chamber of the other cylinder).

When the second control valve 2 is in a position where the pressurized medium is supplied through the second position 2b, a so-called internal circulation is arranged in both cylinders. If it is assumed that the first control valve 1 is in a position in which the connecting line 5 is connected to the supply line 3, pressurized medium is supplied only to the cylinder S on the right hand side in FIG. 1, wherein the pressurized medium remains and acts in the piston chamber 9, the piston rod chamber 10, the second branch line 5b, and the first branch line 5a, without returning at all to the pressurized medium tank from this cylinder S. For implementing this, the pressurized medium pump maintains the required pressure in the cylinder S and causes a movement by feeding there pressurized medium only to the extent required by the difference between the work areas on different sides of the piston 7, thereby reducing the volume flow required by the movement of the piston. In the piston chamber and in the piston rod chamber, the pressure is substantially the same, being effective on the piston 7 on its both sides, however in a way that on the side of the piston chamber 9, the pressure on the piston is directed to a greater work area and on the side of the piston rod chamber 10 it is directed only to an area which is the total area of the piston less the cross-sectional area of the piston rod. As a natural consequence, the piston 7 moves upwards in the figure, thereby also producing said internal circulation of the pressurized medium, that is, pressurized medium is moved from the piston rod chamber 10 to the piston chamber 9, and the connecting line 5 conveys only the volume V corresponding to the formula $V=s \times (A_9-A_{10})$, wherein s is the shift of the piston, i.e. the change in the cylinder length, $A_9$ is the work area of the piston chamber 9 and $A_{10}$ is the work area of the piston rod chamber 10. Thus, for higher speeds of motion, which are directly proportional to the linear shift s in a unit of time, the factor $(A_9-A_{10})$ reduces the product V, and the product indicating the power losses $(p_p-p_2) \times Q$, wherein $p_p$ is the feed pressure of the pump and $p_2$ is the pressure induced by the load in the actuator, is reduced by minimizing the factor Q (=V/t) indicating the volume flow rate. In a corresponding manner, $p_2$ is increased in the same proportion because of the reduced effective work area, and consequently also the expression $p_p-p_2$ is reduced. Moving the leg at the transfer stage takes the same power as before, but the operating efficiency is improved.

For example in cases in which the difference between the work areas is ⅙ of the work area of the parallel connection, the same speeds of motion are achieved at the transfer stage with ⅙ of the volume flow. In a corresponding manner, if the pressure induced by the load in the actuator at the supporting stage is 280 bar and the pressure at the transfer stage with an equal work area would be 40 bar, in the new coupling it will rise to corresponding figures, i.e. 240 bar.

When one cylinder S is active, the other cylinder S' of the actuator moves passively, i.e. it becomes shorter. The volume of the piston chamber 9' will thus be reduced more than the volume of the piston rod chamber 10 is increased. Because also these chambers are coupled to each other through the branches 5a' and 5b', the flow required by the increase in the volume of the piston rod chamber 10' is supplied by the volume displaced from the piston chamber 9', and the excessive volume returns along the connecting line 5' and the return line 4. Thus, the internal circulation will be effective also on the return side of the pressurized medium according to the same principle: the volume of the hydraulic medium displaced from one side of the piston is utilized to supplement the simultaneous volume demand on the opposite side. The coupling can be named as "regenerative coupling".

For swinging the swinging arm to the opposite direction, the first control valve 1 is shifted to a position in which the supply line 3 is connected to the second connecting line 5'. Thus, the control valves 1 and 2 have clearly differentiated functions: the first one is used to change the direction of motion and the second one is used for coupling the cylinders S, S' to the connecting lines 5, 5'. Said first control valve 1 and second control valve 2 are moved to the required positions by control arrangements known as such. They are electrically controlled directional valves. The second control valve 2 is in a position 2a of parallel connection under spring load, and it is moved electrically to the second position 2b. Thus, the actuator is fully operable in both directions, and both ways of coupling are possible irrespective of the direction of motion of the swinging arm.

Figure 2:
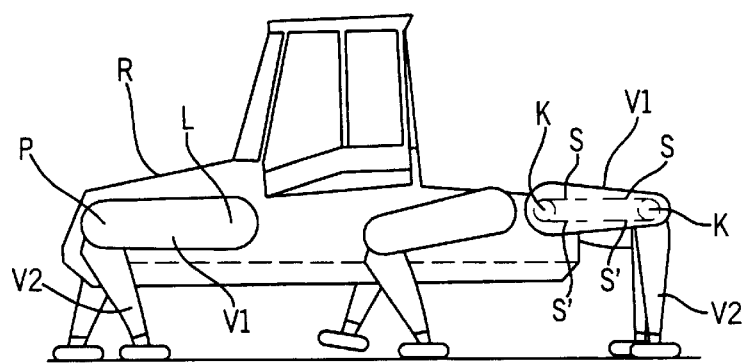
FIG. 2 shows an advantageous embodiment of the invention.

When applying the invention e.g. for moving the walking machine mentioned above, the swinging arm is pivoted by using an arrangement in which the pressurized medium is supplied at the support stage by parallel connection when the second control valve 2 is in the first position 2a, and at the transfer stage, with a smaller power need, by the regenerative coupling in the second position 2b of the valve 2. FIG. 2 shows a typical vehicle advancing by the movement of legs. The actuators can be effective e.g. in the joint between the lower swinging arm V2 and the upper swinging arm V1, i.e. the "knee joint" and in the joint between the upper swinging arm V1 and the body R, i.e. the "hip joint" L. Broken lines illustrate the location of actuators formed by cylinders S, S' in the upper swinging arm V1. The actuator inducing the pivotal movement between the body R and the upper swinging arm V1 at the hip joint L, and the actuator inducing the pivotal movement between the upper swinging arm V1 and the lower swinging arm V2 at the knee joint P are both placed in the upper swinging arm V1, in which the actuator of the hip joint L is connected at one end to a piece included in a torsionally rigid manner in the body R (or to a piece pivotal in relation to the same), and the actuator of the knee joint P is connected at one end to a piece included in a torsionally rigid manner in the lower swinging arm V2. The mechanism and structure of the leg are presented in more detail in the earlier Finnish patent 87171 by the applicant. The electric control of the valve 2 can be connected in a suitable manner to the control automatics of the machine.

The structure of the actuator is not limited solely to the embodiment shown in the drawings, but it can be modified within the scope of the inventive idea presented in the appended claims. For example, the second control valve 2 for changing the parallel coupling to a regenerative coupling can be implemented also in another way. For instance, it can be divided into two separate valves, e.g. by implementing it with two 3/2 directional valves, each being located in a branch line 5b, 5b' of its own, with two connections on the other side of the valve, one for each cylinder. In addition, it is possible to arrange the connecting lines 5, 5' to branch also in another way to piston chambers and piston rod chambers of the cylinders. The embodiment of FIG. 1 with the first branch lines 5a, 5a' leading directly to the piston chambers 9, 9' is advantageous, because in this case a smaller volume flow required/produced by the piston rod chamber needs to be passed through the valve 2.

Although the discussion above has dealt with applying the invention in swinging arms of legs in a vehicle, it can also be used for swinging other swinging arms having a loading stage requiring a power output and great torque at the joint and such a transfer stage requiring great speed that is characterized by a smaller external load on the swinging arm, and particularly in hydraulic systems having several actuators requiring a supply of hydraulic fluid. In all these swinging arms it is possible to use the above-described pair of cylinders that can be driven to both directions either by parallel coupling or by regenerative coupling.

What is claimed is:

1. An actuator for accomplishing the swinging motion of a swinging arm, the actuator comprising:

two cylinders fixed to the swinging arm and using a pressurized medium, arranged to swing the swinging arm around a rotation axis by connecting each cylinder at its one end to the swinging arm and at its other end to a structure in relation to which the swinging arm is arranged to pivot, a pressurized medium system to which the piston chambers and piston rod chambers of the cylinders are connected for supplying pressurized medium to and from the cylinders the system comprising a supply line connected with a feeding pump, a return line connected with a tank, and two connecting lines connected with the piston chambers and the piston rod chambers of the cylinders, wherein the control of the pressurized medium flow into the cylinders is implemented by one or several control valves, in a way that pressurized medium is supplied from the supply line either (a) into both cylinders while they are connected in parallel to said supply line by said one or several control valves or (b) to only one of the cylinders, the supply line being connected by said one or several control valves simultaneously to the piston chamber and the piston rod chamber of the same cylinder.

2. An actuator according to claim 1, wherein the connecting lines are branched into first branch lines leading to the cylinder chambers to the first sides of the pistons and into second branch lines leading to the cylinder chambers to the second sides of the pistons, wherein the second branch lines are provided with a control valve controlling the flow and intended in the first position to guide the pressurized medium to a different cylinder than which the first branch line connected with the supply line enters for implementing the parallel coupling, and in the second position to open a pressurized medium connection between the branch lines entering the same cylinder.

3. An actuator according to claim 2, wherein the control valve is placed in a pair of lines formed by the second branch lines so that it couples the connection pairs on opposite sides either directly or crosswise.

4. An actuator according to claim 1, wherein the first branch lines of the connecting lines are led to the piston chambers and the second branch lines are led to the piston rod chambers, wherein the directional valve is arranged to open a connection from the connecting line to either of the piston rod chambers.

5. An actuator according to claim 1, wherein the actuator is placed in a swinging arm accomplishing the progressive movement of a vehicle.

6. An actuator according to claim 2, wherein the actuator is placed in a swinging arm accomplishing the progressive movement of a vehicle.

7. An actuator according to claim 1, wherein the pressurized medium is hydraulic fluid.

8. An actuator according to claim 2, wherein the pressurized medium is hydraulic fluid.

* * * * *